(No Model.)

G. HART.
SECONDARY BATTERY.

No. 590,151. Patented Sept. 14, 1897.

Witnesses.
Robert Garrett
J.W.B. Keefer

Inventor.
Gilbert Hart.
By James L. Norris
Atty.

UNITED STATES PATENT OFFICE.

GILBERT HART, OF DETROIT, MICHIGAN.

SECONDARY BATTERY.

SPECIFICATION forming part of Letters Patent No. 590,151, dated September 14, 1897.

Application filed January 14, 1897. Serial No. 619,227. (No model.)

*To all whom it may concern:*

Be it known that I, GILBERT HART, a citizen of the United States, residing at Detroit, in the county of Wayne and State of Michigan, have invented new and useful Improvements in Electrodes or Supporting-Plates for Secondary or Storage Batteries, of which the following is a specification.

The purpose of my invention is to provide a simple, novel, and efficient construction for the electrodes or supporting-plates of secondary or storage batteries whereby the active material shall be retained in proper relation to the electrode, while it is at the same time exposed in a suitable manner to the action of the electrolyte.

The essential object of my invention is to provide means whereby the disintegration or crumbling away of the active material under the continued charging and discharging of the battery, which seriously impairs the capacity of the battery for storage of energy and eventually renders it worthless, is avoided. By my present improvements the active material is permanently maintained in efficient union and close contact.

The invention consists, to the ends stated, in the novel features of construction and new combinations of parts hereinafter fully explained, and then particularly pointed out and defined in the claim which concludes this specification.

To enable those skilled in the art to which my said invention pertains to fully understand and practice the same, I will now describe said invention in detail, reference being had for this purpose to the accompanying drawings, in which—

Figure 1:
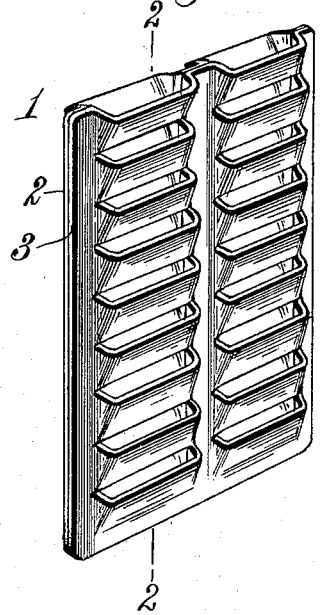
Figure 2:
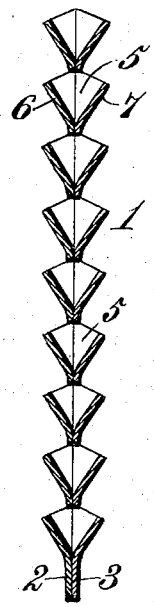
Figure 3:
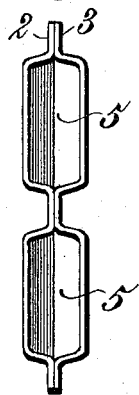
Figure 4:
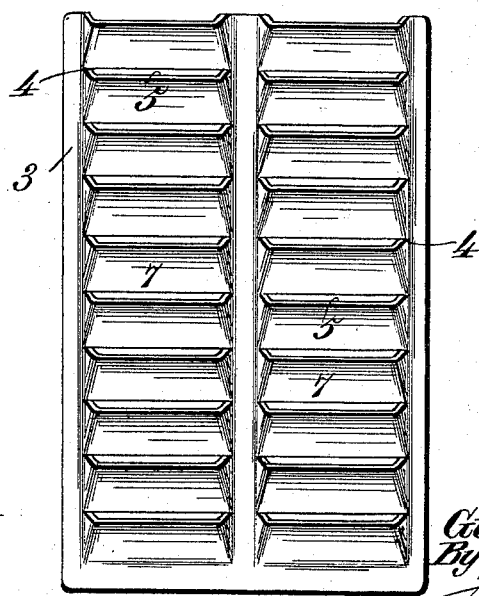

Figure 1 is a perspective view of a plate or electrode constructed in accordance with my invention. Fig. 2 is a section taken in the line 2 2, Fig. 1. Fig. 3 is a plan view of the same. Fig. 4 is a side elevation of one of the two sheets composing the electrode.

The reference-numeral 1 in said drawings indicates a plate or electrode for a secondary or storage battery or accumulator of ordinary form. The substance of the plate is a suitable metal, such as metallic lead, and its construction is as follows:

I take two sheets 2 and 3, of metallic lead, of suitable thickness and of any size and form, according to the dimensions of the cell in which the plate is to be used. These plates, which are preferably flat, are laid together face to face, and a series or a plurality of series of transverse cuts 4 is formed, passing through both sheets, said cuts being of equal length and placed at substantially equal intervals. The metal of each sheet of lead is then by any suitable means drawn outward or away from the adjacent sheet in such manner as to form a series of troughs 5, each of which has two converging sides 6 and 7, which meet at the bottom of the trough.

I may form the half troughs or cells in each sheet separately before said sheets are brought together, and this method of construction I consider preferable. Each sheet may in this manner be very cheaply formed by a suitable die, in which the whole number of half troughs or cells can be struck at a single operation. The sheets thus formed are then brought together, with the parts thus formed registering one with another, and they are united along their edges in any suitable manner—as, for example, by soldering. I may in this manner form as many parallel series of these troughs or cells 5 as the relative dimensions of the plates and cells may permit, the adjacent series being separated by straight plane portions 6 of suitable width. A similar plane surface separates the ends and bottoms of the troughs or cells 5 from the lower and end edges of the plates. An electrode or plate formed in this manner provides a very secure support for the active material, which cannot escape from the cells 5, although it is exposed to the action of the electrolyte as perfectly as it would be in any construction known prior to my invention. The construction is, moreover, extremely cheap, as it can be carried on with great rapidity and requires no special knowledge or skill on the part of the workmen employed.

Heretofore electrodes for secondary batteries have been made having a general resemblance in form to the electrode represented in my drawings. These electrodes, however, have been manufactured in a single piece, which materially affects the cost and rapidity of their production, besides requiring very different instrumentalities.

I make no claim, broadly, to an electrode such as that referred to, nor do I claim an electrode made in two pieces joined together instead of a single piece.

What I claim is—

An electrode for a secondary or storage battery, consisting of two similar sheets of metallic lead, each sheet having half-cells formed by walls integral with the said sheet, the side walls converging toward the latter from the open top of the trough to its bottom, the two plates being united with the half-cells registering adjacent series of said cells being separated by plane vertical portions of the united sheets, which are united when the two plates are brought together, substantially as described.

In testimony whereof I have hereunto set my hand in presence of two subscribing witnesses.

GILBERT HART.

Witnesses:
   THOMAS V. DUTTON,
   A. E. BURGESS.